United States Patent [19]
Lang et al.

[11] 3,947,392
[45] Mar. 30, 1976

[54] FOUNDRY SAND COMPOSITIONS CONTAINING GRAFT COPOLYMERS OF BIOCHEMICALLY-SYNTHESIZED HETEROPOLYSACCHARIDES

[75] Inventors: William J. Lang, Libertyville; John J. Krajewski, Wheeling, both of Ill.

[73] Assignee: International Minerals & Chemical Corporation, Libertyville, Ill.

[22] Filed: Oct. 1, 1971

[21] Appl. No.: 185,804

Related U.S. Application Data

[62] Division of Ser. No. 757,473, Sept. 4, 1968, Pat. No. 3,645,937.

[52] U.S. Cl....... 260/17.4 GC; 164/43; 204/159.12; 260/9; 260/17.4 ST; 260/29.6 H; 260/42; 260/DIG. 40
[51] Int. Cl.².... C08L 5/00; B22C 1/26; B22C 1/22
[58] Field of Search ......... 260/9, 17.4 GC, 17.4 ST

[56] References Cited
UNITED STATES PATENTS

| | | | |
|---|---|---|---|
| 3,640,826 | 2/1972 | Lang et al. | 252/8.5 A |
| 3,644,113 | 2/1972 | Lang et al. | 75/3 |

*Primary Examiner*—Lucille M. Phynes
*Attorney, Agent, or Firm*—Peter Andress; James E. Wolber

[57] ABSTRACT

A sand core and mold composition for use in casting metals comprising foundry sand, clay, water and from about 0.0025% to about 1% by weight of a water-soluble graft copolymer of acrylic acid and a minor amount of a water-soluble polyhydroxy polymeric compound, including water-soluble salts thereof.

16 Claims, No Drawings

3,947,392

FOUNDRY SAND COMPOSITIONS CONTAINING GRAFT COPOLYMERS OF BIOCHEMICALLY-SYNTHESIZED HETEROPOLYSACCHARIDES

This is a division, of application Ser. No. 757,473, filed Sept. 4, 1968, now U.S. Pat. No. 3,645,937, issued Feb. 29, 1972.

BACKGROUND OF THE INVENTION

This invention relates to foundry sand compositions for preparing mold and cores. More particularly, this invention relates to foundry sand compositions which have better workability characteristics and produce fewer defective moldings than foundry sand compositions of the prior art. Still more particularly, this invention relates to the use of water-soluble graft copolymerization products of acrylic acid and a minor amount of a water-soluble polyhydroxy polymeric compound, and water-soluble salts thereof, to impart superior workability characteristics to foundry sand compositions.

Conventional foundry molding sands are prepared by adding a bonding clay, such as a bentonite or fire clay or a combination of such clays, and a critically controlled amount of water to a classified sand which may be of a washed, crude or reclaimed variety. It is also common practice to employ an organic binder such as cereal or dextrine, and a combustible material such as sea coal. Deficiencies in the molding and working properties of the foregoing general type of molding compositions have presented a constant challenge to the foundry industry.

The foundry industry, therefore, has attempted numerous variations in foundry sand compositions with respect to the binder employed, but it has been a general result that the different binders utilized have improved certain molding characteristics while degrading others. The different binders utilized in foundry sand compositions have included synthetic water-soluble polymers. The polymers of the prior art which have been used as binders in foundry sand mold and core compositions have been described as improving properties of the compositions, e.g., as giving good bakeability, good permeability to gases generated during the baking operation, good blendability or the ability to mix well and deposit well upon blowing, and the like. Many of the polymers of the prior art having the above-mentioned properties are deficient in one or more of other essential properties, namely, good green strength, good hot strength, and good deformation characteristics. It was, therefore, impossible to select a single polymer which would produce a good balance of the essential properties of a foundry sand composition.

As illustrative of the types of polymers suggested for use in foundry sand compositions, U.S. Pat. No. 2,817,128 teaches the use of a water-soluble polyelectrolyte, as for example, a polyacrylic acid, instead of organic binders such as cereal and dextrine. These polyelectrolytes are described as improving the workability and flowability of the foundry sand in addition to making the water content of such compositions a less critical variable. An improvement over the use of these polyelectrolytes is described in U.S. Pat. No. 3,104,230 which teaches the use of certain inorganic compounds in combination with the polyelectrolytes to impart superior hot strength properties to the sand compositions. These inorganic compounds include phosphoric acid and the various alkali metal and alkaline earth metal salts of the oxy-acids of phosphorus and the oxy-acids of sulfur, such as tetrasodium pyrophosphate.

Although the aforementioned inorganic compounds provide improvements over the sole use of the polyelectrolytes as binders, the foundry sand compositions of U.S. Pat. No. 3,104,230 still suffer from certain deficiencies. For example, while the use of the aforementioned inorganic compounds improved the hot strength of the foundry sand compositions, the hot strength is not improved to the extent desirable. The utilization of the invention of U.S. Pat. No. 3,104,230 suffers from the further disadvantage that the patent teaches it is necessary that a major proportion of the total clay in the composition be of the Western bentonite type. This limitation presents an economic disadvantage in areas where the sub-bentonitic type of clay is more readily available.

As illustrative of another type of binder suggested for use in foundry sand compositions, U.S. Pat. No. 3,179,523 teaches the use of a magnesium or zinc oxy-salt cement in combination with an organic binder such as a water-soluble polysaccharide or water-soluble polysaccharide derivative.

SUMMARY OF THE INVENTION

This invention is based on the discovery that water-soluble graft copolymerization products of acrylic acid and a minor amount of a water-soluble polyhydroxy polymeric compound substrate, and water-soluble salts thereof, will impart superior workability characteristics to foundry sand compositions. The foundry sand core and mold compositions of this invention comprise a major amount of foundry sand and minor amounts of clay, water, and a graft copolymer of this invention, the graft copolymer being present in an amount sufficient to enhance the workability characteristics of the composition. More specifically, the sand compositions of this invention consist essentially of from about 84 to about 96% by weight of a foundry sand, from about 3 to about 10% by weight of clay, from about 1 to about 5.5% by weight of water, and from about 0.0025 to about 1% by weight of a suitable graft copolymer.

The incorporation of the graft copolymer in the foundry sand composition is effective to impart a good balance of essential molding properties. The graft copolymer achieves the balance of desirable properties without the deleterious effects which commonly result from the use of polymers of the prior art. The foundry molding sand compositions formulated in accordance with the present invention exhibit good green strength, deformation characteristics and hot strength. In addition, the castings produced by utilizing cores and molds made from the compositions of this invention exhibit fewer scabs and other surface defects than when sand compositions of the prior art are employed.

It is, therefore, a primary object of this invention to provide an improved foundry sand composition.

Another object of this invention is to provide a foundry sand composition having superior workability characteristics.

Still another object of this invention is to provide a foundry sand composition with superior hot strength properties.

A further object of this invention is to provide a method for preparing foundry sand compositions which includes incorporating in the compositions a minor but effective amount of a water-soluble graft copolymer of acrylic acid and a minor amount of a water-soluble polyhydroxy polymeric compound, including water-soluble salts thereof.

These and further objects of this invention will be described or be apparent as the description thereof herein proceeds.

DESCRIPTION OF THE PREFERRED EMBODIMENTS

The graft copolymers which are useful in the method of this invention are water-soluble graft copolymers prepared by copolymerizing acrylic acid and a minor amount of a substrate which is a water-soluble polyhydroxyl-containing polymeric material, and water-soluble salts thereof. The amount of the polyhydroxy polymeric compound which is reacted with acrylic acid may vary between about 0.1 and about 10.0% by weight, preferably between about 0.25 and about 5.0% by weight, based on the total weight of the acrylic acid used.

The substrates which are co-reacted with the acrylic acid to produce the graft copolymers which are useful in accordance with this invention are water-soluble polyhydroxyl-containing polymeric compounds other than methyl cellulose. In general, these polymeric compounds may be characterized as having a molecular weight greater than about 350 and containing at least about 5% free hydroxyl groups. The polymeric compounds may contain up to 30% and even higher free hydroxyl groups. It will be evident that the polyhydroxy polymeric compounds may contain substituents other than hydroxyl groups so long as the substituents are inert, i.e., non-reactive with the acrylic acid, under the reaction conditions. Examples of substituents other than mere hydroxyl groups which the polymeric compounds may contain are halo, alkyl, aryl, carboxyalkyl, hydroxyalkyl, halohydroxyalkyl, arylhydroxyalkyl, and the like.

The useful polymeric substrates include water-soluble polysaccharides and polyhydroxyl-containing derivatives thereof. Although disaccharides and trisaccharides may be used in accordance with this invention, the preferred polymeric compounds are the tetra-, penta- and higher polysaccharides and oligosaccharides, i.e., saccharides containing at least four linked monosaccharide molecules, and derivatives thereof containing substituents such as hereinbefore defined. The most preferred substrates include derivatives of cellulose and the biochemically-synthesized heteropolysaccharides.

Some of the specific polymeric polyhydroxy compounds that may be used as substrates to prepare the novel copolymers of this invention include, but are not limited to water soluble derivatives of cellulose such as chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers. Other polymeric compounds which may be coreacted with acrylic acid in accordance with this invention include starch and water-soluble derivatives of starch, e.g., chlorohydroxypropyl starch, phenylhydroxyethyl starch, hydroxybutyl starch, methyl starch, ethyl starch, hydroxyethyl starch, hydroxyethyl methyl starch, hydroxypropyl methyl starch, and carboxymethyl starch. Still other polymeric materials which may be used include the so-called "sugars" such as sucrose, maltose, lactose, raffinose, stachyose and vertascose; causticized lignite; biochemically-synthesized heteropolysaccharides, e.g., produced by the action of bacteria of the genus Xanthomonas or the genus arthrobacter on carbohydrates; polyvinyl alcohol; and polyalkylene glycols and derivatives thereof such as alkoxy polyalkylene glycols, e.g., polyethylene glycols and methoxy polyethylene glycols. It will be apparent to one skilled in the art that useful compounds include those compounds which will form the above-defined polymeric compounds in the acidic reaction medium and such compounds are included in the scope of this invention. For example, carboxymethyl cellulose will be formed from the sodium salt thereof in the acidic reaction medium.

The graft copolymerization can be carried out by using well-known polymerization techniques. Ultraviolet light or any of the well-known peroxygen-type initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired. Redox activated systems can be used in accordance with the usual polymerization practices. Thus, sodium bisulfite-potassium persulfate and hydrogen peroxide-ferrous ion systems may be employed. However, the incremental addition of the peroxygen-type initiator is preferred when a Redox activated systems is utilized.

The quantity of the initiator employed can be varied depending on the reaction temperature and other conditions, but will ordinarily be from about 0.0005 to about 0.01% by weight, preferably from about 0.002 to about 0.004% by weight, based on the weight of the acrylic acid.

The temperature of the reaction is not critical and may vary between about −5° C. and about 100° C. The preferred temperature range is between about 40° C. and about 80° C., with a temperature between about 60° C. and about 70° C. being most preferred. The reaction may be carried out under superatmospheric pressure or even under partial vacuum. However, it is preferred to utilize atmospheric pressure for convenience since the reaction runs very favorably at this pressure.

The graft copolymerization reaction is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acrylic acid since this could cause the polymerization of the acrylic acid in the absence of the polyhydroxy polymeric compound substrate. As illustrative of a suitable manner of combining the reactants, the acrylic acid and the polyhydroxy polymeric compound are each dissolved in separate amounts of water so as to provide homogeneous solutions thereof. These solutions are mixed and the initiator is then added to the mixed solution. Alternatively, the polyhydroxy polymeric compound may be dissolved in water to provide a homogeneous solution to which the acrylic acid and the initiator are added. Other methods of combining the reactants and initiator will be obvious to one skilled in the art. Optimum results will be obtained if the polyhydroxy polymeric compound is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperature and/or quantity of the initiator present. In general, the time should be sufficient to consume at least 95% of the acrylic acid. To illustrate the variance of the reaction time at different temperatures, polymerization was evident in about 5 to 7 hours when acrylic acid was reacted at 60°C. with about 1.0% by weight of the carboxymethyl cellulose, based on the weight of the acrylic acid, and 0.002% by weight of hydrogen peroxide, based on the weight of acrylic acid, was present. On the other hand, polymerization was complete in about 15 to 20 minutes when the reaction was carried out at 100°C. using the same relative amounts of the reactants and the initiator. Polymerization may be detected by a change in refractive index, and completion of the reaction may be detected by the absence of the distinctive odor of acrylic acid.

At the completion of the polymerization reaction, the copolymer thus produced may be converted to the salt form. This conversion is generally effected by neutralization with an appropriate hydroxide. Ammonium or alkali metal salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

The copolymers, in either the acid form or the salt form, may be converted to a dry form if so desired. This may be accomplished by conventional techniques, such as by heating the aqueous solution of the copolymer in a drum drier at a temperature of about 105°C. to drive off the water and yield a dry polymer.

The graft copolymers may be used in accordance with this invention in either the acid form or the salt form (e.g., as ammonium and alkali metal salts). The amount of the graft copolymer to be used may be varied considerably. As little as about 0.0025% by weight of the green foundry sand composition, produces satisfactory core or mold mixes for some purposes, while in others amounts as large as about 1% or more may be utilized. In general, from about 0.01 to about 0.5% by weight will be found to be satisfactory for most purposes, with from about 0.05 to about 0.1% by weight being particularly preferred.

The foundry sand compositions of this invention will generally contain from about 3 to about 10% by weight of clay, but lesser and greater amounts of clay will be used in certain applications. However, the amount of the clay in most instances will range from about 5 to about 7.5% by weight. Standard foundry refractory and bentonite-type clays may be utilized in the compositions of this invention, but it is preferred that a major proportion of the total clay be a bentonite type of clay. Western or natural sodium bentonite and native or sub-bentonitic clays are useful. The Western clays impart better workability characteristics to the core and mold compositions than the sub-bentonitic clays. The difference in the properties imparted to the sand compositions is apparently due to differences in the chemical compositions of the clays. Sub-bentonitic clays are generally calcium or magnesium varieties of montmorillonite and may contain substantial proportions of non-clay or non-montmorillonite impurities. The Western bentonitie clays, which are natural sodium clays, are sometimes herein referred to as merely as "bentonitic" clays.

When a sub-bentonitic or calcium montmorillonite type of clay is used, the clay is preferably first treated with an alkali metal compound which is water-soluble, ionizable, and has an ion capable of reacting with calcium to form a water-soluble precipitate. Such compounds include, as for example, alkali metal carbonates, hypophosphates, oxalates, borates, phosphates, silicates, sulfites and tartrates. Sodium carbonate or soda ash is particularly preferred. The amount of the alkali metal compound employed will be somewhat dependent upon the proportion of calcium montmorillonite in the clay. In general, amounts of from about 0.5 to about 6% by weight of the clay will be used. The preferred quantities for treatment are from about 2 to about 4% by weight of the clay.

The sand employed can be any of the standard foundry sands of the washed, crude or reclaimed varieties. It is generally preferred to use a clean, washed round- or sub-angular grained silica base sand. Such sand is available is a wide range of particle sizes containing particles ranging from about 30 to about 270 mesh or finer U.S. series. The sand will be present in the composition in the amount of from about 84 to about 96% by weight of the composition, exclusive of combustible materials such as sea coal, with a range of from about 89 to about 93% being preferred.

The only other ingredient required in the sand mix of this invention in addition to the graft copolymer, clay and sand is water. In general, moisture is required to impart moldability to the mix and for the development of satisfactory green strength. Satisfactory green strength, moldability, and surface finish are obtained when there is from about 1 to about 5.5% by weight total moisture in the mix. A total moisture content in the range of from about 2 to about 4% by weight is particularly preferred.

The compositions of this invention may contain ingredients in addition to the aforementioned four essential ingredients, i.e., graft copolymer, clay, sand and water, in the amounts indicated. Other ingredients conventionally used in the foundry practice may be present in minor amounts, as for example, thermoplastic and thermosetting natural and synthetic resins, flour or cereals, zirconite, sea coal and the like. For example, the sand compositions hereinbefore defined may be mixed with a combustible material such as sea coal in an amount of up to about 14% by weight, or even higher, of the total weight of the four essential ingredients. If desired, a minor amount, e.g., from about 0.05 to about 1% by weight of the composition, of a water-soluble borate such as a sodium borate may be used to further increase the green strength and improve response to mulling. In addition, the foundry mold and core sand compositions may also contain a minor amount, e.g., from about 0.05 to about 0.5% by weight of the composition, of one of the inorganic compounds described in U.S. Pat. No. 3,104,230 as being useful in combination with polyelectrolytes. Therefore, it will be understood that the term "consisting essentially of" when used herein is intended to indicate the named ingredients of a composition plus other materials of a nature and in such amounts as will not substantially adversely affect the properties of the composition for its intended purposes, such as described above.

In the practice of this invention, the ingredients of the sand composition may be mixed in any conventional manner and in any order. However, as hereinbefore pointed out, it is preferred that any alkali metal compound such as soda ash be added to the clay before the clay is combined with any of the other ingredients of the composition when a sub-bentonitic clay is used. The graft copolymer in a dry finely divided form may be mixed with dry sand and clay to form a composition to which only the correct amount of water need be added before use. Inasmuch as the graft copolymers are water-soluble in both the acid and salt forms, they may be added in an aqueous solution to a dry mixture of the sand and clay. In still another alternative method of mixing the ingredients, the acid or salt form of the graft copolymer may be added in the dry form or in an aqueous solution to the clay before the clay is combined with the sand. When an aqueous solution of the graft copolymer is added to the sand and/or clay, the concentration of the solution may be adjusted to yield a core or mold mix of the desired total moisture content.

Intermixture of the ingredients of the composition of this invention may be performed by hand, in an internal mixer, in a paddle type mixer, or in any of the low and high speed mulling machines conventionally employed for preparing such compositions. No particular care as to time and temperature of mixing need be exercised. An efficient internal mixer or mulling machine produces a homogeneous composition in a very short time, usually from about one-half to about four minutes.

Once a uniform and homogeneous molding composition has been prepared by thorough mulling and mixing of the aforementioned ingredients, it is ready for use. It is poured or forced under pressure into a suitable core or mold box, or on a pattern or other shaping device, and rammed or tamped in place sufficiently to completely fill all recesses. When compacted or shaped in such a manner the core or mold is easily removed from the shaping device and is found to be hard and of such high green strength that it is easily handled in subsequent operations.

The green core or mold, which may be dried or baked, if necessary, is ready for use. It may be dried at room temperature, or it may be baked in an oven or dried with a torch if the air drying is undesirably slow. The operation in which the green core or mold is converted to a hard, dry condition is essentially a dehydration operation.

The following non-limiting example will serve to further illustrate this invention.

In the example the following terms are defined in accordance with the standards of the American Foundrymen's Society (hereinafter referred to as "A.F.S."), and they represent various quality criteria of foundry molding compositions as determined by standard test methods and specifications of the A.F.S. The term "moldability index" is an indication of the state of workability of the sand in molding for metal castings. This is determined by utilization of a Harry W. Dietert Company moldability tester No. 875. The term "green hardness" is defined as the resistance offered by the surface of a green mold to deformation in a small area. This measurement in made with a Harry W. Dietert Company green hardness tester No. 473. The term "permeability" as used herein refers to the physical property which determines the ability of gases to flow through molded masses of foundry molding compositions. The permeability test is made with a Harry W. Dietert Company permmeter according to the A.F.S. standard permeability procedure. The term "green compression strength" is defined as the pressure in pounds per square inch required to cause collapse of a standard rammed cylinder of undried sand composition. The term "deformation" is the change in linear dimension of a foundry molding composition test specimen when it is subjected to an applied stress. This measurement is taken with a Universal sand strength machine No. 405. The term "dry compression strength" is defined as the pressure in pounds per square inch required to cause collapse of a standard rammed cylinder of the sand composition after being dried. The term "green shear strength" represents, in pounds per square inch of a cross-sectional area, the maximum shear stress which a foundry sand mixture, in its green state, is capable of withstanding without deformation. This measurement is taken with a Universal sand strength machine No. 405. Lastly, the term "hot strength" is the compressive strength of a hot composition after being soaked at an elevated temperature for about 12 minutes. A Thermolab Dialotometer 753 is used to take this measurement.

A first foundry molding sand composition is prepared in accordance with this invention by thoroughly mulling 92.3 parts by weight of A.F.S. No. 56 sand, 5 parts by weight of a Western bentonite, 2.12 parts by weight of water, and 0.1 part by weight of a sodium salt of an acrylic acid carboxymethyl cellulose graft copolymer which is prepared as outlined above. A second sand composition is prepared by following the teachings of the prior art for the purpose of comparison with the composition of this invention. This second composition is prepared by thoroughly mulling 98.6 parts by weight of A.F.S. No. 56 sand, 2.22 parts by weight of water, and 5 parts by weight of a mixture comprising 100 parts by weight of a Western bentonite, 0.1 part by weight of a sodium polyacrylamide and 0.1 part by weight of tetrasodium pyrophosphate. Portions of each of the resulting compositions are then tested for moldability, green hardness, permeability, green compression strength, deformation, dry compression strength, green shear strength and hot strength in accordance with the standards of the A.F.S. The results of these tests show that improvements in the workability of foundry sand compositions may be achieved by incorporation therein of a minor amount of a graft copolymer of this invention. For example, the composition of this invention has a hot strength at 1800° F. which is over 100 pounds per square inch greater than the hot strength which the composition of the prior art has. In addition, the composition of this invention exhibits superior moldability, permeability, green compression strength, deformation characteristics, and dry compression strength as compared to the compositions of the prior art. The green hardness and green shear strength of the sand composition of this invention are comparable to those properties of the prior art composition.

Although this invention has been described in relation to specific embodiments it will be apparent that obvious modifications may be made by one skilled in the art without departing from the intended scope of the invention as defined by the appended claims.

What is claimed is:

1. A foundry molding composition comprising a major amount of foundry sand and minor amounts of clay, water, and a water-soluble graft copolymer, said graft copolymer being present in an amount sufficient to enhance the workability of said composition and being of the group consisting of a graft copolymerization product of acrylic acid and from about 0.1 to about 10% by weight, based on the weight of said acrylic acid, of a biochemically-synthesized heteropolysaccharide, and water-soluble salts of said graft copolymerization product, said biochemically-synthesized heteropolysaccharide containing at least about 5% free hydroxyl groups and being free of substituents other than hydroxyl groups that are reactive with acrylic acid.

2. A foundry molding composition in accordance with claim 1 containing from about 0.0025 to about 1% by weight of said graft copolymer, and said graft copolymerization product is an ultraviolet light or peroxygen-type compound induced graft copolymerization product.

3. A foundry molding composition in accordance with claim 2 comprising from about 84 to about 96% by weight of said foundry sand, from about 3 to about 10% by weight of said clay, and from about 1 to about 5.5% by weight of water.

4. A foundry molding composition in accordance with claim 3 wherein said graft copolymerization product is a peroxide free radical induced graft copolymerization product.

5. A foundry molding composition in accordance with claim 4 wherein said graft copolymerization product is a hydrogen peroxide or hydroperoxide-induced graft copolymerization product of acrylic acid and from about 0.25 to about 5% by weight, based on the weight of said acrylic acid, of said biochemically-synthesized heteropolysaccharide.

6. A foundry molding composition in accordance with claim 4 including said graft copolymerization product.

7. A foundry molding composition in accordance with claim 4 including a water-soluble salt of said graft copolymerization product.

8. A foundry molding composition in accordance with claim 7 including an alkali metal salt of said graft copolymerization product.

9. A foundry molding composition in accordance with claim 8 including a sodium salt of said graft copolymerization product.

10. A foundry molding composition in accordance with claim 4 wherein a major proportion of said clay is a bentonitic clay.

11. A foundry molding composition in accordance with claim 4 wherein a major proportion of said clay is a sub-bentonitic clay treated with from about 0.5 to about 6% by weight, based on the weight of said clay, of soda ash.

12. A foundry molding composition in accordance with claim 5 comprising from about 89 to about 93% by weight of said sand, from about 5 to about 7.5% by weight of said clay, from about 2 to about 4% by weight of water, from about 0.01 to about 0.5% by weight of said graft copolymer, and from about 0.05 to about 1% by weight of a water-soluble borate.

13. A foundry molding composition in accordance with claim 5 comprising from about 89 to about 93% by weight of said sand, from about 5 to about 7.5% by weight of said clay, from about 2 to about 4% by weight of water, and from about 0.05 to about 0.1% by weight of said graft copolymer, a major proportion of said clay being a sub-benonitic clay treated with from about 0.5 to about 6% by weight, based on the weight of said sub-bentonitic clay, of soda ash.

14. A foundry molding composition in accordance with claim 5 comprising from about 89 to about 93% by weight of said sand, from about 5 to about 7.5% by weight of said clay having a bentonitic clay as a major proportion thereof, from about 2 to about 4% by weight of water, and from about 0.05 to about 0.1% by weight of said graft copolymer.

15. A foundry molding composition in accordance with claim 5 comprising from about 89 to about 93% by weight of said sand, from about 5 to about 7.5% by weight of said clay having a bentonitic clay as a major proportion thereof, from about 2 to about 4% by weight of water, and from about 0.05 to about 0.1% by weight of an alkali metal or ammonium salt of said graft copolymerization product.

16. A foundry molding composition from about 84 to about 96% by weight of a foundry sand, from about 3 to about 10% by weight of clay, from about 1 to about 5.5% by weight of water, and from about 0.0025 to about 1% by weight of a graft copolymer, said graft copolymer being a hydroperoxide or hydrogen peroxide-induced graft copolymerization product of acrylic acid and from about 0.25 to about 5% by weight, based on the weight of said acrylic acid, of a biochemically-synthesized heteropolysaccharide, or a water-soluble salt of said graft copolymerization product.

* * * * *